Patented May 27, 1947

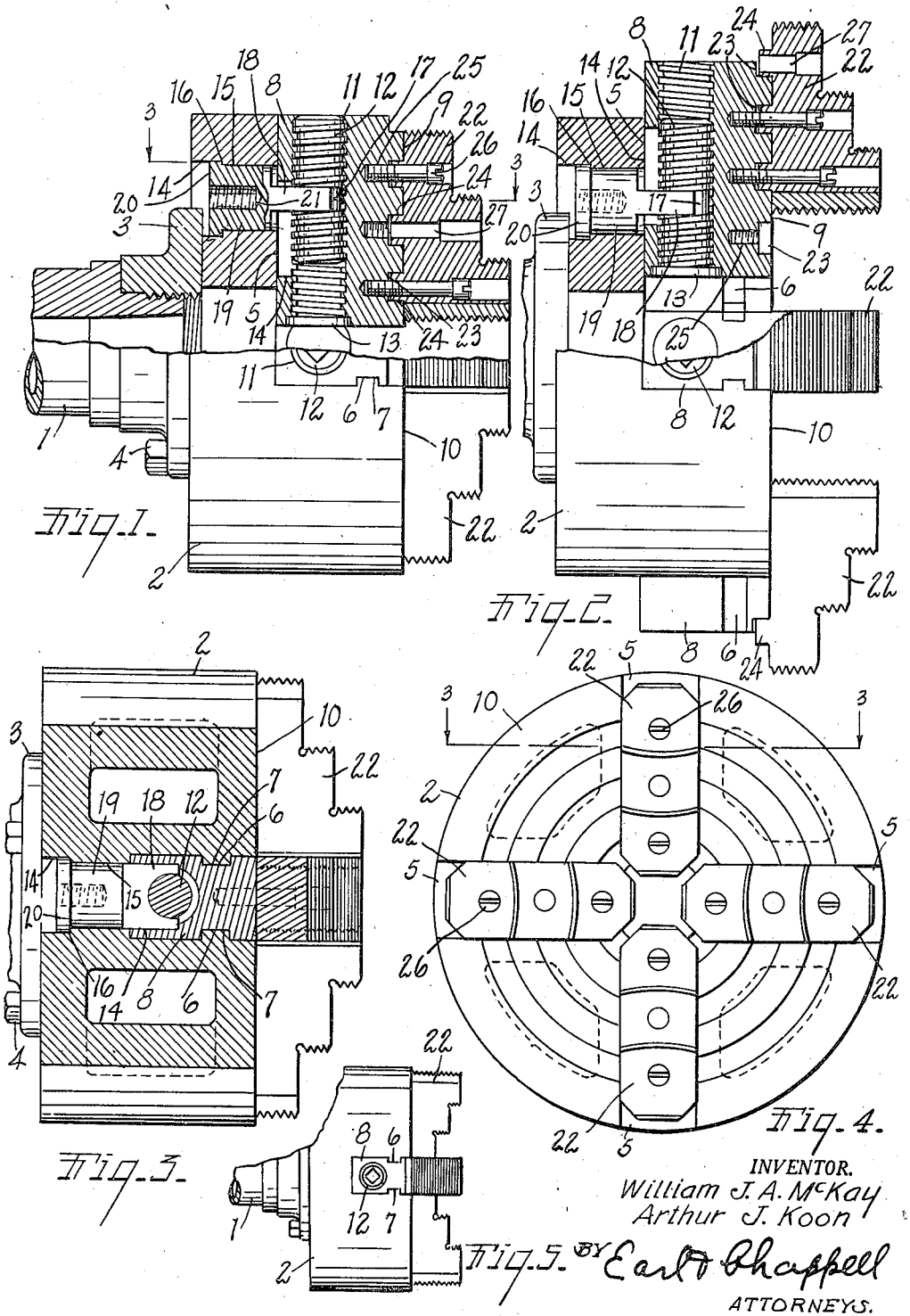

2,421,281

UNITED STATES PATENT OFFICE 2,421,281

CHUCK

William J. A. McKay and Arthur J. Koon,
Grand Rapids, Mich.

Application September 8, 1944, Serial No. 553,142

4 Claims. (Cl. 279—112)

This invention relates to improvements in chucks.

The main objects of this invention are:

First, to provide an improved chuck which has a wide range of adjustability and adaptability to the work.

Second, to provide a chuck in which the adjusting parts are effectively housed and protected from chips and shavings so that wear is minimized thereon and the parts are not likely to become clogged or inoperative.

Third, to provide a structure having these advantages which is strong and rigid and at the same time the parts are comparatively simple to produce and assemble.

Objects pertaining to details and economies of the invention will definitely appear from the description to follow. The invention is defined in the claims.

A structure which embodies the features of the invention is clearly illustrated in the accompanying drawing, in which:

Fig. 1 is a fragmentary side elevation partially in longitudinal section of a chuck embodying the features of our invention with the jaws in fully closed position.

Fig. 2 is a similar view with the jaws in fully open position.

Fig. 3 is a fragmentary view partially in longitudinal section on a line corresponding to line 3—3 of Fig. 4, showing certain of the structural details.

Fig. 4 is a front elevation with the jaws fully closed as shown in Fig. 1.

Fig. 5 is a fragmentary side elevation showing further structural details.

In the accompanying drawing 1 represents the spindle of a lathe or the like to which the head or body member 2 of the chuck is secured by means of the adapter or coupling member 3 which is threaded on to the spindle and is secured to the body member 1 by means of the screws 4. The body member provided with a plurality of radially disposed channel-like jaw slideways 5, the embodiment illustrated having four such slideways. The side walls of the channel slideways are provided with opposed longitudinal ribs 6 which engage grooves 7 in the sides of the jaw slides 8. The jaw supporting faces 9 of the jaw slides are preferably flush with the face 10 of the body member as best shown in Fig. 3.

The jaw slides have longitudinal threaded bores 11 receiving the adjusting screws 12. The inner ends of these bores are closed, the closures in the embodiment illustrated being in the form of disks 13. The jaw slides have longitudinal grooves 14 in the bottoms thereof opening to the bores 11. The body member 2 has bores 15 shouldered at 16 and registering with these grooves 14. The screws 12 have annular grooves 17 intermediate the ends thereof, these grooves being engaged by the forked ends 18 of the anchoring lugs 19 which are arranged in the bores 15.

These lugs 19 are preferably a press fit within the bores and are provided with flanges 20 seating on the shoulders 16. It will be noted that the screws 12 are anchored against longitudinal movement so that as they are rotated the jaw slides are advanced or retracted. With the jaw slides in position to fully close the jaws as shown in Fig. 1 the screws are completely housed in the bores in the slides. This is a feature of material advantage as with the closing of the inner ends of the bores and the closing of the bores receiving the anchoring lugs the screws and the parts coacting therewith are effectively protected from chips or cuttings, thus preventing their becoming clogged and requiring disassembly for cleaning purposes. The parts are also protected so that the life thereof is greatly prolonged.

The jaws 22 are of the stepped type and are adjustably and reversibly mounted on the jaw slides, being shown in reversed position in Fig. 5. The jaw slides are provided with radially spaced recesses 23 with which the lugs 24 on the jaws may be selectively engaged. The lug receiving recesses 23 have tapped bores 25 in the bottoms thereof receiving the jaw securing screws 26. The jaws have shouldered bores 27 receiving the screws. This arrangement permits the radial and reversing adjustment of the jaws and their effective anchoring in the selected position.

We have illustrated an embodiment of our invention which has been found highly practical. We have not illustrated or described other embodiments and adaptations as it is believed this disclosure will enable those skilled in the art to embody or adapt the invention as may be desired.

Having thus described the invention what is claimed as new and desired to secure by Letters Patent is:

1. In a chuck, the combination of a body member having radial channel-like slideways provided with opposed jaw slide engaging ribs on the side walls thereof, jaw slides slidable in said ways and grooved to receive said ribs, said jaw slides having longitudinally disposed threaded bores therein open at their outer ends and longitudinal slots in the bottoms thereof opening to said bores, closures for the inner ends of said bores, jaw adjusting screws threaded into said bores and having annular grooves intermediate their ends, said screws when the jaws are in their inner position of adjustment being entirely housed in said bores, screw anchoring lugs mounted within said body member to project through said slots in said jaw slides and forked to engage the grooves in said screws, said closures and the walls of the inner ends of said bores constituting housings for the inner ends of said screws to protect the same from chips and shavings, and jaws carried by said jaw slides.

2. In a chuck, the combination of a body member having radial channel-like jaw slideways, jaw slides slidable in said ways and having interlocking slidable engagement therewith, said jaw slides having longitudinally disposed threaded bores therein open at their outer ends and longitudinal slots in the bottoms thereof opening to said bores, closures for the inner ends of said bores, jaw adjusting screws threaded into said bores and having annular grooves intermediate their ends, said body member having shouldered bores opening to the bottoms of said slideways and registering with said slots in said jaw slides, and screw anchoring members disposed in said bores in said body member to project through said slots in said slides into engagement with said grooves in said screws, said closures and the walls of the inner ends of said bores constituting housings for the inner ends of said screws to protect the same from chips and shavings.

3. In a chuck, the combination of a body member having a jaw slideway, a jaw slide having slidable dove-tailed engagement with said slideway, said jaw slide having a longitudinal threaded bore closed at its inner end and a longitudinal slot opening to said bore, an adjusting screw having an annular groove intermediate its ends, said body member having a shouldered bore opening to the bottom of said slideway and registering with said slot in said jaw slide, and a screw anchoring member disposed in said bore in said body member to project through said slot in said slide into engagement with said groove in said screw.

4. In a chuck, the combination of a body member having a jaw slideway, a jaw slide having slidable engagement with said slideway, said jaw slide having a longitudinal threaded bore closed at its inner end and a longitudinal slot opening to said bore, an adjusting screw having an annular groove intermediate its ends, a screw anchoring member mounted on said body member to project through said slot in said slide into engagement with said groove in said screw, the closed end of the bore constituting a housing to protect the inner end of the screw from chips and shavings, and a jaw carried by said jaw slide.

WILLIAM J. A. McKAY.
ARTHUR J. KOON.

REFERENCES CITED

The following references are of record in the file of this patent:

UNITED STATES PATENTS

| Number | Name | Date |
|---|---|---|
| 422,479 | Witson | Mar. 4, 1890 |
| 1,468,186 | Weisenberger | Sept. 18, 1923 |
| 1,713,803 | Whiton | May 21, 1929 |
| 257,250 | Stevens | May 2, 1882 |
| 1,814,699 | Hubbell | July 14, 1931 |

FOREIGN PATENTS

| Number | Country | Date |
|---|---|---|
| 4,484 | Great Britain | 1914 |